(12) United States Patent
Ryu et al.

(10) Patent No.: US 10,595,286 B2
(45) Date of Patent: Mar. 17, 2020

(54) METHOD AND DEVICE FOR CONTROLLING TRANSMISSION POWER OF TERMINAL IN D2D COMMUNICATION

(71) Applicant: Samsung Electronics Co., Ltd., Gyeonggi-do (KR)

(72) Inventors: Hyunseok Ryu, Yongin-si (KR); Seunghoon Park, Seoul (KR); Sangwon Choi, Suwon-si (KR); Jeongho Park, Seoul (KR); Peng Xue, Hwaseong-si (KR); Hyunkyu Yu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/501,157

(22) PCT Filed: Jul. 24, 2015

(86) PCT No.: PCT/KR2015/007748
§ 371 (c)(1),
(2) Date: Feb. 1, 2017

(87) PCT Pub. No.: WO2016/018009
PCT Pub. Date: Feb. 4, 2016

(65) Prior Publication Data
US 2017/0230918 A1    Aug. 10, 2017

(30) Foreign Application Priority Data

Aug. 1, 2014  (KR) ........................ 10-2014-0099177
Nov. 5, 2014  (KR) ........................ 10-2014-0153143

(51) Int. Cl.
*H04W 52/38* (2009.01)
*H04L 27/26* (2006.01)
*H04W 72/02* (2009.01)

(52) U.S. Cl.
CPC ........... *H04W 52/383* (2013.01); *H04L 27/26* (2013.01); *H04W 72/02* (2013.01)

(58) Field of Classification Search
CPC ................. H04W 4/005; H04W 4/008; H04W 52/00–60; H04W 72/04–08; H04W 72/02; H04L 27/26
See application file for complete search history.

(56) References Cited

U.S. PATENT DOCUMENTS 6,128,506 A * 10/2000 Knutsson .............. H04W 52/24
                                                                370/333
2008/0069033 A1  3/2008 Li et al.
(Continued)

FOREIGN PATENT DOCUMENTS

KR    10-2013-0070661 A    6/2013
KR    10-2014-0060162 A    5/2014

OTHER PUBLICATIONS

Samad Ali, et al., Full Duplex Device-to-Device Communication in Cellular Networks, 2014 International Conference on Computing, Networking and Communications Wireless Networks Symposium, Feb. 6, 2014, pp. 721-725, publisher IEEE, Piscataway, NJ.

*Primary Examiner* — Raymond S Dean

(57) ABSTRACT

The present invention relates to a method for controlling the power of a terminal in device-to-device (D2D) communication and, particularly, to a device and a method for supporting Type 1 discovery or Mode 2 D2D communication. The present invention relates to a method for controlling the transmission power of a terminal performing D2D communication, and the terminal, the method comprising the steps of: selecting an arbitrary resource in a discovery period for D2D resource selection; determining whether the selected resource satisfies a preset transmission power control condition; and transmitting information for the D2D communication through the selected resource, by using the (Continued)

power determined according to the determination result. The present disclosure relates to a communication scheme for fusing IoT technology with a 5G communication system for supporting a data rate higher than that of a 4G system and subsequent systems thereafter. The present disclosure can be applied to intelligent services (for example, a smart home, a smart building, a smart city, a smart or connected car, healthcare, digital education, retail business, security and safety related services, and the like) on the basis of the 5G communication technology and IoT related technology.

18 Claims, 14 Drawing Sheets

(56) References Cited

U.S. PATENT DOCUMENTS

| | | | |
|---|---|---|---|
| 2008/0069062 | A1 | 3/2008 | Li et al. |
| 2010/0272029 | A1 | 10/2010 | Laroia et al. |
| 2011/0275382 | A1* | 11/2011 | Hakola ................ H04W 24/10 455/452.2 |
| 2013/0138831 | A1* | 5/2013 | Patil ...................... H04W 8/005 709/235 |
| 2013/0157676 | A1 | 6/2013 | Baek et al. |
| 2013/0322413 | A1 | 12/2013 | Pelletier et al. |
| 2013/0329631 | A1* | 12/2013 | Alam ................. H04W 52/362 370/328 |
| 2014/0133593 | A1 | 5/2014 | Lim et al. |
| 2014/0198655 | A1 | 7/2014 | Ishii et al. |
| 2015/0181543 | A1* | 6/2015 | Hwang ............... H04W 56/002 370/336 |
| 2015/0215846 | A1* | 7/2015 | Wang ................ H04W 72/0446 370/336 |
| 2015/0245193 | A1* | 8/2015 | Xiong ................... H04W 76/14 370/328 |
| 2015/0296403 | A1* | 10/2015 | Guan ................ H04W 28/0215 370/235 |
| 2015/0327180 | A1* | 11/2015 | Ryu .......................... H04L 1/00 370/329 |
| 2017/0006457 | A1* | 1/2017 | Harada ............. H04W 72/0453 |
| 2017/0034799 | A1* | 2/2017 | Kim .................... H04W 56/00 |
| 2017/0171897 | A1* | 6/2017 | Ryu ..................... H04L 5/0044 |
| 2017/0215114 | A1* | 7/2017 | Li ..................... H04W 36/0072 |

\* cited by examiner

FIG. 12

| In-band Emission between D2D UEs | | Impact to eNB | |
|---|---|---|---|
| | | YES ($P_{eNB}$) | NO ($P_{MAX}$) |
| Congestion | YES ($P_{D2D}$) | min{$P_{D2D}$, $P_{eNB}$} | $P_{D2D}$ |
| | NO ($P_{MAX}$) | $P_{eNB}$ | $P_{MAX}$ |

METHOD AND DEVICE FOR CONTROLLING TRANSMISSION POWER OF TERMINAL IN D2D COMMUNICATION

CROSS-REFERENCE TO RELATED APPLICATION(S)

The present application claims priority under 35 U.S.C. § 365 to International Patent Application No. PCT/KR2015/007748 filed Jul. 24, 2015, entitled "METHOD AND DEVICE FOR CONTROLLING TRANSMISSION POWER OF TERMINAL IN D2D COMMUNICATION", and, through Korean Patent Application No. 10-2014-0099177 filed Aug. 1, 2014, and Korean Patent Application No. 10-2014-0153143 filed Nov. 5, 2014, each of which are incorporated herein by reference into the present disclosure as if fully set forth herein.

TECHNICAL FIELD

The present invention relates to a transmit power control method of a terminal in D2D communication and, in particular, to a device and method for supporting Type 1 discovery or Mode 2 D2D communication.

BACKGROUND ART

The rapid increase of smartphone use in recent years is spurring development of various application services and contents, and it is expected that this tendency is likely to be accelerated. In line with this tendency, various technologies for efficiently preparing for data overload caused by such various application services are being studied for use in cellular systems.

In order to meet the increasing demand for wireless data traffic since the commercialization of 4G communication systems, the development focus is on the $5^{th}$ Generation (5G) or pre-5G communication system. For this reason, the 5G or pre-5G communication system is called a beyond 4G network communication system or post Long Term Evolution (LTE) system. Consideration is being given to implementing the 5G communication system in millimeter wave (mm Wave) frequency bands (e.g., 60 GHz bands) to accomplish higher data rates. In order to increase the propagation distance by mitigating propagation loss in the 5G communication system, discussions are underway about various techniques such as beamforming, massive MIMO, Full Dimensional MIMO (FD-MIMO), array antenna, analog beamforming, and large scale antenna. Also, in order to enhance network performance of the 5G communication system, developments are underway of various techniques such as evolved small cell, advanced small cell, cloud Radio Access Network (RAN), ultra-dense network, Device to Device (D2D) communication, wireless backhaul, moving network, cooperative communication, Coordinated Multi-Points (CoMP), and interference cancellation. Furthermore, the ongoing research includes the use of Hybrid FSK and QAM modulation and Sliding Window Superposition Coding (SWSC) as Advanced Coding Modulation (ACM), Filter Bank Multi Carrier (FBMC), Non-Orthogonal Multiple Access (NOMA), and Sparse Code Multiple Access (SCMA).

Meanwhile, the Internet is evolving from a human-centric communication network in which information is generated and consumed by humans to the Internet of Things (IoT) in which distributed things or components exchange and process information. The combination of the cloud server-based Big data processing technology and the IoT begets Internet of Everything technology. In order to secure the sensing technology, wired/wireless communication and network infrastructure, service interface technology, and security technology required for implementing the IoT, recent research has focused on sensor network. Machine to Machine (M2M), and Machine Type Communication (MTC) technologies. In the IoT environment, it is possible to provide an intelligent Internet Technology that is capable of collecting and analyzing data generated from connected things to create new values for human life. The IoT can be applied to various fields such as smart home, smart building, smart city, smart car or connected car, smart grid, health care, smart appliance, and smart medical service through legacy Information Technology (IT) and convergence of various industries.

Thus, there are various attempts to apply the IoT to the 5G communication system. For example, sensor network, Machine to Machine (M2M), and Machine Type Communication (MTC) technologies are implemented by means of 5G communication technologies such as beamforming, MEMO, and array antenna. The application of the aforementioned cloud RAN as a big data processing technology is an example of convergence between the 5G and IoT technologies.

Recently, Device to Device (D2D) communication (or direct communication) has been spotlighted for relieving increased base station load from large mobile contents by using the proximity of mobile communication terminals. D2D communication has been adopted as a study item of the current 3GPP LTE release 12, and RAN1 study started D2D standardization in January 2013. Meanwhile, RAN plenary agreed to end the D2D study item in February 2014 and start the D2D work item standardization from March 2014.

The LTE-based D2D communication technology may include D2D discovery and D2D communication.

D2D discovery is a process in which a UE checks the identities or interests of other UEs located nearby or advertises its identity or interest to other UEs located nearby. Here, the identity and interest may be represented by a UE identifier (ID), an application identifier, or a service identifier, and these can be configured diversely depending on the D2D service and operation scenario.

It is assumed that the protocol layers of the UE include a D2D application layer, a D2D management layer, and a D2D transport layer. The D2D application layer accommodates D2D service application programs running on the Operating System (OS) of the UE, the D2D management layer is responsible for the function of converting the discovery information generated by a D2D application program to a format suited to the transport layer, and the transport layer corresponds to the PHY/MAC layer of the LTE or Wi-Fi wireless communication standard. D2D discovery is performed with the following procedure. If the user executes the D2D application program, the application layer generates discovery information to the D2D management layer. The management layer converts the discovery information received from the application layer to a management layer message. The management layer message is transmitted through the transport layer of the UE, and the UEs receiving the message operate in the reverse order of the transmission process.

D2D communication is a communication method for exchanging traffic between UEs without passing through any infrastructure such as an eNB or Access Point (AP). D2D communication may be performed based on the result of the D2D discovery procedure (i.e., with the discovered UEs) or without D2D discovery procedure. Whether the D2D discovery procedure is required before D2D communication depends on the D2D service and operation scenario.

The D2D service scenarios may be categorized into commercial service or non-public safety service and public safety service. The services may include an innumerable number of examples such as advertisement, Social Network Service (SNS), game, and public safety service.

1. Advertisement: A communication network operator supporting D2D allows preregistered stores, cafes, movie theaters, and restaurants to advertise their identities to D2D users located within a short distance using D2D discovery or D2D communication. At this time, the interests may include advertisers' promotions, event information, and discount coupons. If the corresponding identity matches the interest of a user, the user may pay a visit to the corresponding store and collect more information through legacy cellular communication or D2D communication. In another example, a personal user may discover a taxi around him/her through D2D discovery and exchange data about a destination or fare through the legacy cellular communication or D2D communication.

2. Social Network Service (SNS): A user may send other users located within a short distance the user's application and interests in the corresponding application. At this time, the identity or interest used for D2D discovery may be a buddy list or the application identifier. The user may share contents such as photos and videos with the neighboring users through D2D communication after D2D discovery.

3. Game: The user discovers other users and game applications for playing a mobile game with neighboring users through the D2D discovery procedure and performs D2D communication for transmitting data necessary for the game.

4. Public Safety Service: Police and firefighters may use the D2D communication technology for public safety purposes. That is, in the case where cellular communication is not available because of a cellular network breakage caused by an emergency situation such as a fire or a landslide or a natural disaster such as an earthquake, volcanic eruption, or tsunami, the police and firefighters may discover neighboring colleagues or share the emergency situation information with neighboring users using the D2D communication technology.

The current 3GPP LTE D2D standardization is directed to both D2D discovery and D2D communication, but the standardization range is different. Commercial use is an aim of D2D discovery; thus, it should be designed to operate in the network coverage of an eNB. That is, D2D discovery is not supported in the situation where no eNB exists (or out of the coverage of an eNB). Public safety and disaster network services are aims of D2D communication rather than commercial use; thus, it should be supported in and out of network coverage and in partial network coverage of an eNB (communication in the situation where some UEs are located in the coverage of the eNB and other UEs are located out of the coverage of the eNB). Accordingly, public safety and disaster network services are provided through D2D communication without support of D2D discovery.

A characteristic of both D2D discovery and D2D communication is that they are performed in LTE uplink subframes. That is, the D2D transmitter transmits D2D discovery signals and data for D2D communication in the uplink subframes, and the D2D receiver receives them in the uplink subframes.

In the current LTE system, the UE receives data and control information from the eNB through downlink and transmits data and control information to the eNB through uplink, but the operation of the current D2D transmitter/receiver differs from those in the legacy LTE. For example, the D2D function-enabled UE has an orthogonal frequency division multiplexing (OFDM)-based receiver to receive the downlink data and control information from the eNB and a single carrier-frequency division multiplexing (SC-FDM)-based transmitter to transmit uplink data and control information to the eNB. However, since the D2D UE has to support both the cellular mode and D2D mode, it has to have an extra SC-FDM receiver to receive the D2D data and control information in uplink as well as the OFDM-based receiver and the SC-FDM-based transmitter.

The current LTE D2D defines two types of D2D discovery schemes according to resource allocation scheme.

1. Type 1 discovery: The eNB broadcasts the uplink resource pool available for D2D discovery in a System Information Block (SIB) for all D2D UEs within the cell under its control. At this time, the resource size available for D2D (e.g., x consecutive subframes) and period of resource (e.g., repeating at every y seconds) are informed. The sending D2D UEs that have received the information select the resource for transmitting D2D discovery signals in a distributed manner. Meanwhile, the receiving D2D UEs have to receive all D2D discovery signals transmitted in the resource pool and including SIB information.

2. Type 2 discovery: The eNB notifies the receiving D2D UEs of the discovery resource pool using the SIB. The discovery signal resources for the sending D2D UEs are scheduled by the eNB. At this time, the eNB may perform scheduling in a semi-persistent manner or a dynamic manner.

Like D2D discovery, D2D communication can be categorized into two types according to resource allocation scheme.

1. Mode 1: The eNB notifies the D2D transmitter of the data transmission resource for D2D communication directly.

2. Mode 2: The eNB notifies the D2D transmitter of the available resource pool, and the UEs select the resource in a distributive manner in the resource pool for transmission.

Meanwhile, in the LTE D2D standard, consideration has been given to using Frequency Division Multiplexing (FDM) for D2D terminals, and it has been agreed to apply frequency multiplexing on Physical Uplink Control Channel (PUCCH) as the uplink feedback channel of legacy cellular terminals and Physical Uplink Shared Channel (PUSCH) for D2D discovery and communication even in the subframe allocated for D2D communication purposes. It is assumed that maximum power transmission is used to increase coverage of D2D discovery and D2D communication in the LTE D2D standardization.

In the Type 1 discovery and Mode 2 communication, the eNB allocates D2D resources by means of a System Information Block (SIB) transmitted in a downlink subframe. For example, the eNB scrambles the D2D discovery signal and D2D communication (data transmission) resource allocation information with a System Information-Radio Network Temporary Identifier (SI-RNTI) or D2D-RNTI and transmits the scrambled signal through a Physical Downlink Control Channel (PDCCH). All of the UEs located within the cell know the SI-RNTI that is used by the UEs to acquire the allocation information included in the SIB transmitted through the PDCCH. The SIB is transmitted through a Physical Downlink Shared Channel (PDSCH). That is, the UE acquires resource allocation information of the SIB for PDSCH from the PDCCH and decodes to acquire resource allocation information for transmitting D2D discovery signals.

Once the resources for the D2D discovery signal transmission or the D2D data transmission are allocated, the UEs having D2D discovery signals or D2D data to transmit select radio resources (Resource Blocks (RBs)) for transmitting D2D discovery signals or D2D data in a distributed manner on the allocated resources. The distributed resource selection may be categorized into two schemes: random resource selection and energy sensing-based resource selection.

1. Random resource selection (1) The UE selects resources randomly in the D2D resource pool allocated by the eNB for transmission.

2. Energy sensing-based resource selection (1) The UE measures the energy level of all radio resources (Resource Blocks (RBs)) during a predefined period. Here, the predefined period is a subset of the D2D resource pool.

(2) The UE selects an RB having the lowest energy level to transmit peer discovery information or data, or it selects randomly one of the RBs at which the energy level is equal to or less than a predetermined threshold value (i.e., lowest x %, e.g., 5%) to transmit the discovery information or data.

DISCLOSURE OF INVENTION

Technical Problem

In the above-described conventional method, a D2D transmitter transmits a discovery signal and data on the frequency-time resources (RB) allocated for D2D communication at the maximum transmit power to secure D2D coverage. Utilizing the maximum transmit power is advantageous to secure discovery performance and data coverage of the D2D transmitter, but it may cause interference to the uplink signals transmitted with adjacent frequencies. That is, if the D2D transmitter uses its maximum transmission power, this may cause in-band emission depending on the dynamic range limit of the Automatic Gain Control (AGC) of an eNB receiver or a D2D receiver.

For example, if a D2D transmitter located close to an eNB transmits a signal on a D2D PUSCH at the maximum transmit power, the D2D PUSCH may cause in-band emission interference to the PUCCH which is transmitted for feedback of a cellular UE in the state of being multiplexed with the D2D PUSCH on the frequency axis.

Also, if a D2D transmitter A located close to the D2D receiver transmits a D2D signal on PUSCH RB A at the maximum transmit power, although a D2D transmitter B which is located far from the D2D receiver transmits a D2D signal on PUSCH RB B at the maximum transmit power (here, RB A and RB B are resources orthogonal on the frequency axis), the signal transmitted by the D2D transmitter A causes in-band emission interference to the D2D signal transmitted by the D2D transmitter B because of the dynamic range limit of the D2D receiver AGC; thus, the D2D receiver cannot receive correctly the D2D signal transmitted by the D2D transmitter B.

There is therefore a need of a method for overcoming the in-band emission problems of D2D transmissions on the PUCCH to the eNB that are caused by using the maximum transmit power of D2D UEs when the PUSCH transmitted by the D2D UE and the PUCCH for feedback of the legacy cellular UE are frequency-multiplexed in the same subframe.

Solution to Problem

In order to solve the above problem, the present invention provides a method and apparatus for improving reliability of D2D communication signals and D2D data signals.

In detail, the present invention provides a method and apparatus for alleviating in-band emission problems occurring at the base stations and D2D receivers because of the power control of the D2D terminals.

In accordance with an aspect of the present invention, a transmit power control method of a terminal performing Device-to-Device (D2D) communication includes selecting a resource during a discovery period configured for D2D resource selection, determining whether the selected resource fulfils a predetermined transmit power control condition, and transmitting D2D communication information on the selected resource at a transmit power selected according to the determination result.

In accordance with another aspect of the present invention, a terminal performing Device-to-Device (D2D) communication includes a communication unit which transmits and receives D2D communication information and a controllercontroller which selects a resource during a discovery period configured for D2D resource selection, determines whether the selected resource fulfils a predetermined transmit power control condition, and controls the communication unit to transmit D2D communication information on the selected resource at a transmit power selected according to the determination result.

Advantageous Effects of Invention

The transmit power control method of the present invention is advantageous in terms of overcoming the in-band emission problem occurring between D2D UEs located in a hotspot area and the in-band emission problem that the D2D transmission UE incurs to an eNB receiver or a D2D reception UE.

Also, the power control method of the present invention is advantageous in terms of minimizing the influence of D2D communication to the legacy cellular system and improving reception reliability of D2D discovery signals or D2D data.

BRIEF DESCRIPTION OF DRAWINGS

FIG. 12 is a diagram illustrating an exemplary table listing predetermined transmit power values according to an embodiment of the present invention;

MODE FOR THE INVENTION

Figure 1:
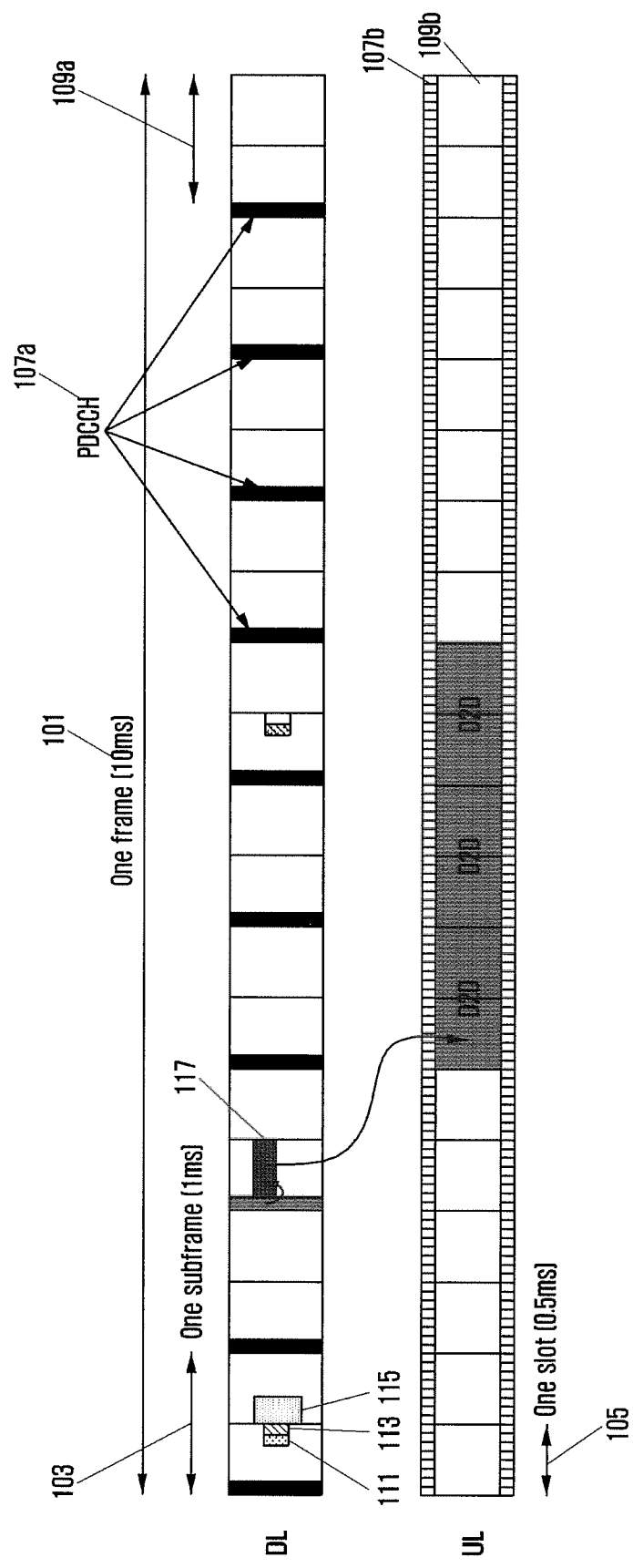
FIG. 1 is a diagram for explaining D2D resource allocation according to an embodiment of the present invention.

The present invention can be applied to all the types of devices or services supporting D2D communication as well as normal electronic devices such as a smartphone, a portable terminal, a mobile terminal, a cellular phone, a Personal Digital Assistant (PDA), a Portable Multimedia Player (PMP), a handheld device, a laptop computer, a Wibro terminal, a smart TV, and a smart refrigerator.

Embodiments of the present invention are described in association with D2D transmitting devices and D2D receiving devices as UEs supporting D2D communication. The transmitting or receiving device may be referred to as a system, a subscriber unit, a subscriber station, a mobile station, a mobile terminal, a remote station, a remote terminal, a mobile device, a user terminal, a terminal, a D2D terminal, a radio communication device, a user agent, a user device, or a user equipment. The D2D transmitting device may be referred to as a D2D transmitter, a transmitter, a D2D transmitting terminal, a transmission terminal, a transmission node, or a transmitting party; the D2D receiving device may be referred to as a D2D receiver, a receiver, a D2D reception terminal, a reception terminal, a reception node, or a receiving party. A UE supporting D2D communication may operate as a transmitting device or a receiving device according to its operation mode.

A D2D UE performs data communication in one of the D2D discovery and D2D communication schemes. The D2D UE performs D2D discovery in one of Type 1 and Type 2 discovery. The Type 1 discovery is characterized in that a plurality D2D UEs select resources to use in a distributed manner in the resource pool allocated by the eNB, and it may be referred to as Type 1, Type 1 discovery, first discovery allocation scheme (method), distributed discovery resource allocation, and the like. The type 2 discovery is characterized in that an eNB allocate discovery resources to the D2D UEs explicitly, and it is referred to as Type 2, type 2 discovery, second discovery resource allocation scheme (method), explicit discovery resource allocation, and the like. Meanwhile, the D2D UE performs D2D communication in one of Mode 1 and Mode 2 communication schemes. In Mode 1 communication, the eNB allocates D2D communication resources to the D2D UEs, and this scheme is referred to as Mode 1, first communication resource allocation scheme (method), explicit communication resource allocation, and the like. Mode 2 communication is characterized in that a plurality of D2D UEs select resources in a distributed manner in the resource pool allocated by the eNB, and this scheme is referred to as Mode 2, second communication resource allocation scheme, distributed communication resource allocation, and the like. The embodiments of the present invention can be more effectively applied to (but are not limited to) the Type 1 discovery and Mode 2 communication among the D2D discovery and D2D communication schemes, and it is obvious that the present invention can be applied to various types of D2D discovery and D2D communication schemes including the aforementioned schemes without departing from the spirit and scope of the present invention.

The terminology used herein is for the purpose of describing particular embodiments only and is not intended to be limiting of the invention. Unless otherwise defined, all terms used herein have the same meaning as commonly understood by one of ordinary skill in the art to which this invention pertains, and they should be interpreted neither as having an excessively comprehensive meaning nor as having an excessively contracted meaning.

As used herein, the singular forms "a", "an", and "the" are intended to include the plural forms as well, unless the context clearly indicates otherwise. It will be further understood that the terms "comprises", "comprising", "includes", and/or "including" when used herein, specify the presence of stated features, integers, steps, operations, elements, and/or components, but they do not preclude the presence or addition of one or more other features, steps, operations, elements, components, and/or groups thereof.

Exemplary embodiments of the present invention are described with reference to the accompanying drawings in detail. Detailed descriptions of well-known functions and structures incorporated herein may be omitted to avoid obscuring the subject matter of the present invention. Further, the following terms are defined in consideration of the functionality in the present invention, and they may vary according to the intention of a user or an operator, usage, etc. Therefore, the definition should be made on the basis of the overall content of the present specification.

FIG. 1 is a diagram for explaining D2D resource allocation according to an embodiment of the present invention. In detail, FIG. 1 is a diagram illustrating a D2D resource allocation method for use in a radio communication system (e.g., LTE system) according to an embodiment of the present invention. The resource allocation method depicted in FIG. 1 may exemplify resource allocation for Type 1 discovery and Mode 2 communication.

Although the embodiment of FIG. 1 is directed to a Frequency Division Duplexing (FDD) system, the present invention is not limited to the FDD system.

In reference to FIG. 1, the FDD system uses different frequency bands for downlink (DL) and uplink (UL). For each frequency band, one radio frame 101 consists of 10 subframes 103. One subframe consists of two slots 105, and one slot consists of 6 or 7 symbols. The subframe 103 includes control channel regions 107a and 107b for transmitting control channels and data channel regions 109a and 109b for transmitting data channels, and the control and data channel regions are separated in the time domain on the DL frequency band and in the frequency domain on the UL frequency band.

A Primary Synchronization Signal (PSS) 111 and a Secondary Synchronization Signal (SSS) 113 are mapped to the last two symbols of the first slots of the first subframe (subframe 0) and the sixth subframe (subframe 5) of the DL frame. The PSS 111 and the SSS 113 are used for synchronization between a UE and an eNB.

A Physical Broadcast Channel (PBCH) 115 is mapped to the second slot of the first subframe (subframe 0) of the DL frame, and the UE acquires system information from the PBCH 115.

In the radio communication system of the present invention, the D2D resource allocation information is transmitted in a System Information Block (SIB) 117 which is broadcast at an interval, which can be designed to have a value in the range from 40 ms to 640 ms or higher.

The D2D UEs acquire downlink synchronization with the system based on the PSS 111 and SSS 113 and receive the information on their serving cells based on the Master Information Block (MIB). For example, the MIB may include essential parameters such as DL system bandwidth, system frame number, and Physical Hybrid-ARQ Indication Channel (PHICH). The UEs that have received the MIB may receive the Physical Downlink Control Channel (PDCCH) transmitted by the eNB at every subframe. Basically, the PDCCH carries DL/UL resource allocation information. Each UE decodes SIB resource allocation information contained in the PDCCH using a previously informed System Information-Radio Network Temporary Identifier (SI-RNTI) or D2D-RNTI. That is, the UE performs PDCCH decoding with the SI-RNTI to acquire the information on the time-frequency region to which the SIB 117 is mapped and then decodes the SIB 117 on the corresponding time-frequency region.

The UE that has succeeded decoding the SIB 117 acquires D2D resource allocation information (D2D UL subframe information) (this may be the information on the D2D resource pool for Type 1 discovery or Mode 2 communication) to check the subframe numbers and successive subframes for D2D purposes in the corresponding frame and the D2D subframe interval.

If the D2D subframe positions are changed in the corresponding frame (e.g., D2D subframe may be changed from subframe 3 to subframe 5 or the number of subframes may increase from 2 to 3), the eNB may notify the UEs of the change of the D2D resources through an SIB or a paging channel.

In the Type 1 discovery or Mode 2 communication, the transmitting UE selects the D2D resource in the D2D subframe(s) allocated through the SIB to transmit the D2D information (D2D signal and D2D data), and the receiving UE decodes the D2D subframe(s) allocated through the SIB.

Figure 2:
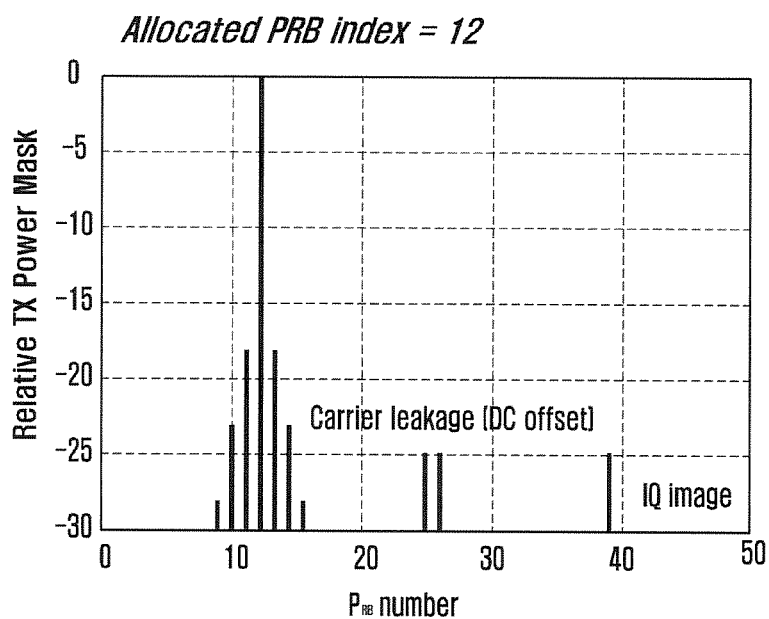
FIG. 2 is diagrams for explaining in-band emission occurring in a radio communication system.
Figure 2:
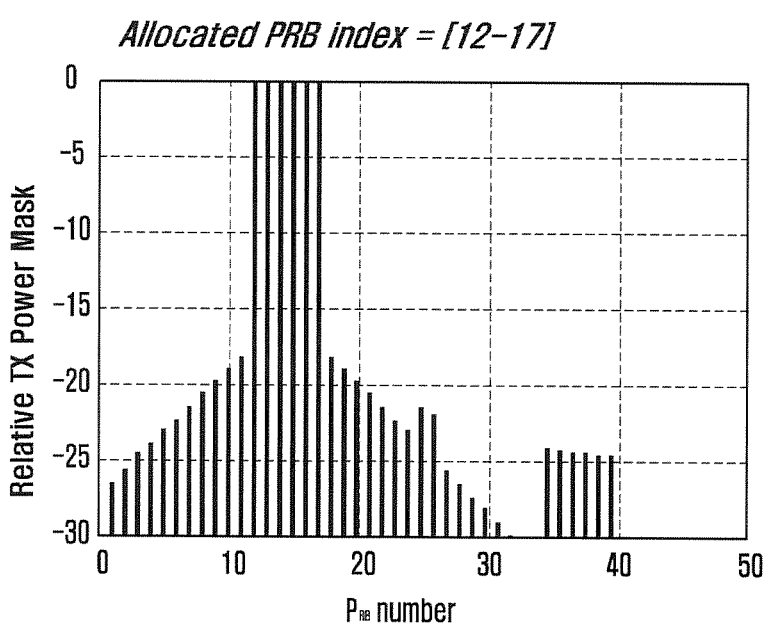

FIG. 2 is diagrams for explaining in-band emission occurring in a radio communication system. The embodiments of FIGS. 2A and 2B are directed to the cases of using 50 Resource Blocks (RBs) in the bandwidth of 10 MHz.

FIG. 2 is directed to a case where the D2D Tx UE uses the $12^{th}$ RB (1 RB), and to a case where the D2D Tx UE uses the $12^{th}$ to $17^{th}$ RBs (6 RBs).

In FIG. 2, the relative transmit power of the D2D Tx UE using the $12^{th}$ RB is 0 dB. That is, if the transmit power of the D2D Tx UE is X dBm at the $12^{th}$ RB, the relative transmit power at the $12^{th}$ RB is 0 dB. Although the transmit power should be confined to the $12^{th}$ RB under the assumption of no in-band emission, FIG. 2B shows leakage power caused by the in-band emission at the $9^{th}$, $10^{th}$, $11^{th}$, $13^{th}$, $14^{th}$, and $15^{th}$ RBs because in-band emission exists in the real communication environment. This means that although the D2D Tx UE use only the $12^{th}$ RB this may incur interference at the adjacent RBs. If the resource amount for use by the D2D Tx UE increases, the effect of in-band emission interference becomes worse as shown in FIG. 2.

Figure 3:
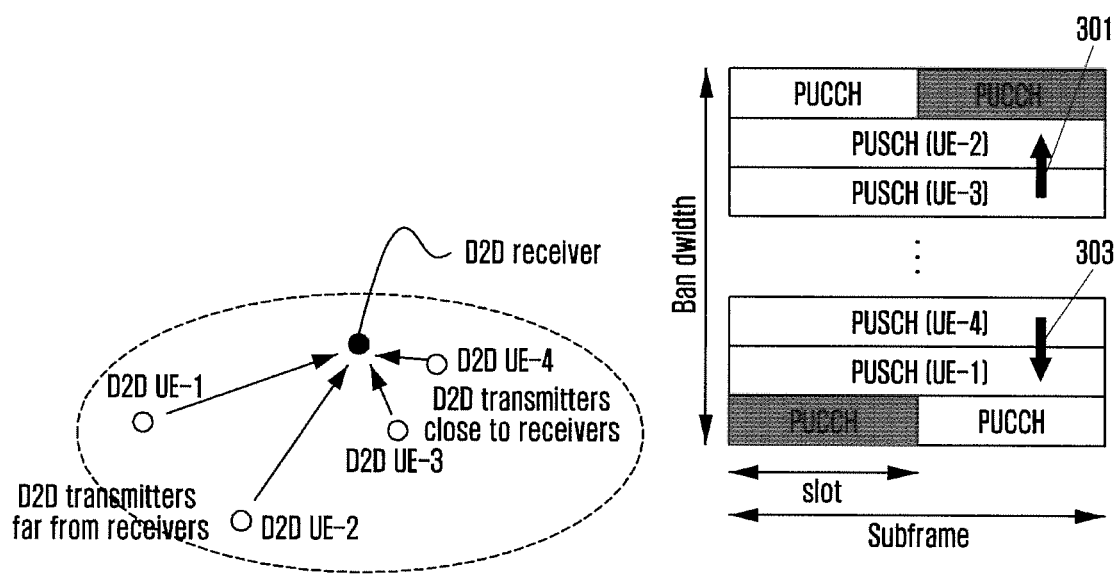
FIG. 3 is a diagram for explaining in-band emission at a D2D Rx UE.

FIG. 3 is a diagram for explaining in-band emission at a D2D Rx UE. In detail, FIG. 3 shows the interference problem caused by in-band emission of the D2D Tx UE (D2D transmitter) at the D2D Rx UE (D2D receiver)

In reference to FIG. 3, there are remote D2D transmitters (D2D UE-1 and D2D UE-2) located far from the D2D receiver and close D2D transmitters (D2D UE-3 and D2D UE-4) located close to the D2D receiver in the radio communication system. Each D2D transmitter transmits D2D discovery signal or D2D data at the maximum power on the D2D resource, i.e., PUSCH, allocated by the eNB or selected autonomously.

In this case, although all of the D2D transmitters use the orthogonal frequency resources (RBs), the RB-receiving power of PUSCH occupied by the D2D UE-3 or D2D UE-4 may cause interference to the RB-receiving power of PUSCH occupied by the D2D UE-1 and D2D UE-2 at the D2D receiver because of the AGC dynamic range limit of the D2D receiver as denoted by reference numbers 301 and 303.

Figure 4:
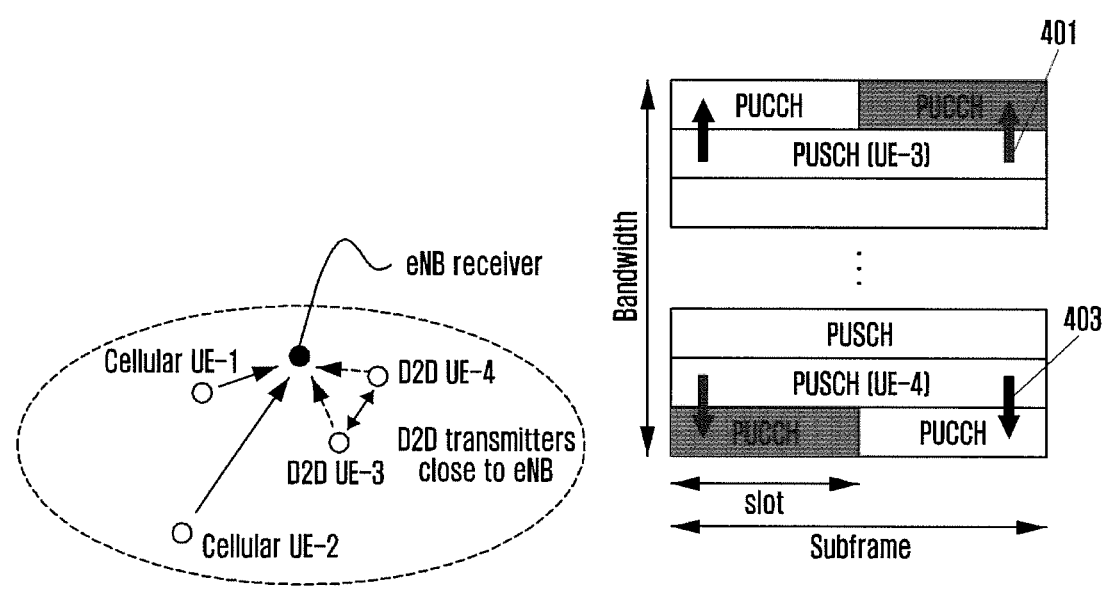
FIG. 4 is a diagram for explaining in-band emission at an eNB.

FIG. 4 is a diagram for explaining in-band emission at an eNB. In detail, FIG. 4 shows an interference problem caused by in-band emission of a D2D Tx UE (D2D transmitter) at an enhanced node B (eNB).

In reference to FIG. 4, there is a cellular UE (UE-1) located close to the eNB receiver and a cellular UE (UE-2) located far from the eNB receiver in a radio communication system. Also, there are D2D transmitters (D2D UE-3 and D2D UE-4) located close to the eNB receiver in the radio communication system.

It is assumed that the cellular UEs are transmitting feedback such as HARQ ACK/NACK and CQI through PUCCH. At this time, in order for the eNB receiver to receive the PUCCH at a predetermined reception power, the eNB performs transmit power control on the cellular UEs (UE-1 and UE-2) transmitting PUCCH. For example, the eNB controls the cellular UEs (UE-1 and UE-2) such that the UE-2 located far from the eNB transmits PUCCH at a high transmit power and the UE-1 located close to the eNB transmits PUCCH at a low transmit power.

Meanwhile, it is assumed that the D2D transmitters (UE-3 and UE-4) located close to the eNB perform D2D discovery or D2D communication on the D2D resources, i.e., PUSCH, allocated by the eNB or selected autonomously.

At this time, although the PUCCH used by the cellular UEs (UE-1 and UE-2) and the PUSCH used by the D2D UE are mapped to different resources on the time axis, if the D2D transmitter does not perform power control (i.e., if the D2D UE transmits D2D discovery signal or D2D data at the maximum power), the PUCCH of the cellular UE undergoes in-band emission interference caused by the PUSCH of the D2D UE at the eNB as denoted by reference numbers 401 and 403.

In another example, the cellular resources allocated to the cellular UEs (UE-1 and UE-2) for UL data transmission and the D2D resources allocated to the D2D UEs (UE-3 and UE-4) may be frequency division-multiplexed (FDMed) into the same subframe. The transmit power control is performed on the PUSCH for use by the cellular UEs (UE-1 and UE-2) in a similar manner to PUCCH. That is, the UE-1 transmits the cellular PUSCH at a low transmit power while the UE-2 transmits the cellular PUSCH at a high transmit power. If the D2D transmitter does not control the transmit power, the PUSCH of the cellular UE undergoes interference caused by the PUSCH transmitted by the D2D UE at the eNB.

Figure 5:
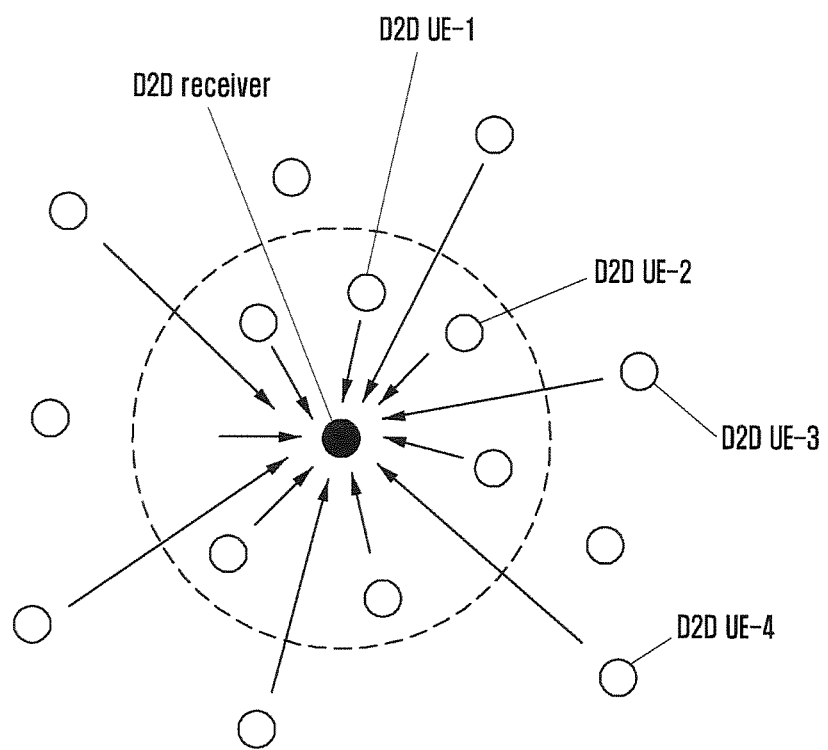
FIG. 5 is a diagram for explaining in-band emission among D2D Tx UEs.

FIG. 5 is a diagram for explaining in-band emission among D2D Tx UEs. In detail, FIG. 5 shows interference caused by in-band emission among the D2D transmitters at a D2D receiver in a congested network environment.

In reference to FIG. 5, there are D2D transmitters (UE-1 and UE-2) located close to the D2D receiver and D2D transmitters (UE-3 and UE-4) located far from the D2D receiver in a radio communication system. In a congested network environment, a plurality of UEs exist around the UE-1 and UE-2. This situation occurs frequently at a hotspot such as a department store, an airport, and a shopping mall.

The D2D transmitters transmit D2D discovery signals or D2D data at their maximum powers. In this case, the in-band emissions of the D2D transmitters (UE-1 and UE-2) located close to the D2D receiver cause interference to the D2D discovery signals or D2D data of the D2D transmitters (UE-3 and UE-4) located far from the D2D receiver; thus, the D2D receiver cannot correctly receive the signals of the D2D transmitters (UE-3 and UE-4) located far from the D2D receiver.

D2D discovery aims to discover as many as possible of neighboring D2D UEs during a given time period. D2D communication aims to broadcast data such that as many as possible of the neighboring UEs receive the broadcast data. In order to meet such requirements, it is necessary to solve the in-band emission problem. That is, in the congested environment as shown in FIG. 5, the D2D signals transmitted by the UEs located close to the D2D receiver such as UE-1 and UE-2 may cause in-band emission problems to the signals transmitted by the UEs located far from the D2D receiver such as UE-3 and UE-4. There is therefore a need of a method for solving this problem.

Figure 6:
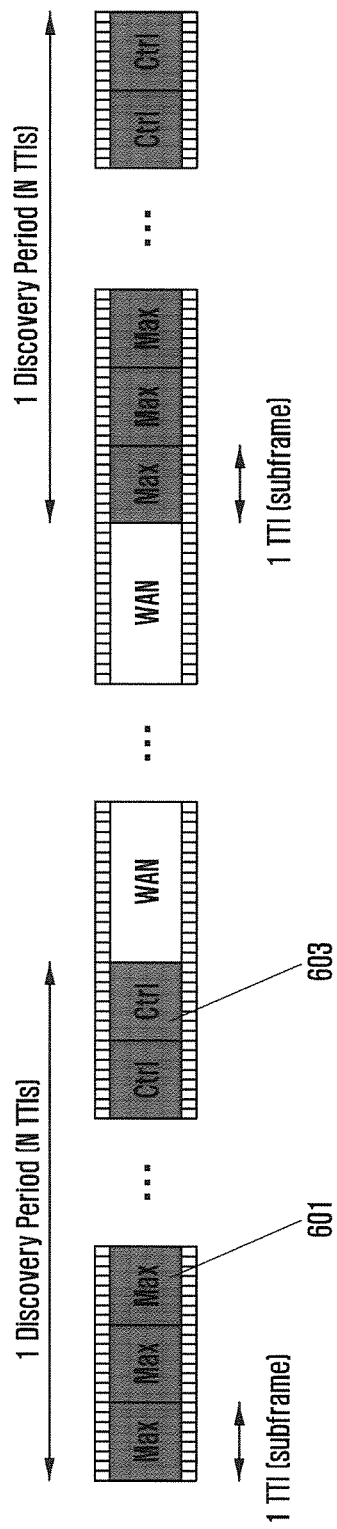
FIG. 6 is a diagram illustrating a D2D resource structure according to an embodiment of the present invention.

FIG. 6 is a diagram illustrating a D2D resource structure according to an embodiment of the present invention.

A D2D UE performs D2D discovery to detect and select resources for D2D discovery or D2D communication. Here, D2D discovery can be used in the same or a different meaning as or from D2D discovery for discovering interested neighboring UEs as a kind of D2D communication.

The eNB broadcasts information on one discovery period comprised of N Transmission Time Intervals (TTIs) for D2D discovery using an SIB for the UEs located within the cell. The information on the one discovery period includes the size of the discovery period (number of TTIs) and the length of the discovery period (time).

In an embodiment of the present invention, one discovery period includes maximum transmit power resource regions 601 (or referred to as Max. region, maximum transmit power region, non-control region, or maximum region) and controlled transmit power resource regions 603 (or referred to as Ctrl. region, controlled region, and non-maximum region) for D2D Tx UEs. The Max. region 601 and Ctrl. region 603 may be distinguished from each other based on the maximum allowed transmit power or whether power control is required. According to various embodiments, the length of one discovery period and the numbers and positions of the Max. regions 601 and Ctrl. regions 603 are not limited.

The resource region information may be delivered from the eNB to the D2D UEs using an SIB. According to various embodiments, the D2D resource region information (type of D2D resource region and number and positions of arbitrary resource regions) may be transmitted in various message formats, without restriction, as well as SIB. For example, the D2D resource region information may be transmitted to the D2D UE through higher layer signaling such as RRC signaling. According to an embodiment of the present invention, the D2D UE controls transmit power for transmitting D2D information (D2D discovery signal or D2D data) based on the type of resource region and presence/absence of network congestion. The D2D UEs acquire the discovery period information and D2D resource region information from the SIB. The D2D UEs also determine whether the network is in a congested state based on the total power level of the received signals. As a consequence, the UE may control the transmit power for transmitting the corresponding D2D information based on the type of the D2D resource pool including the D2D resource to use and the presence/absence of network congestion.

According to an embodiment of the present invention, a D2D UE may operate differently in the D2D information transmission mode and the D2D information reception mode. In the D2D transmission mode, the D2D Tx UE may operate differently depending on the method for selecting D2D resources for transmitting the D2D information. The D2D UE operates as follows in the respective operation modes.

1. Random resource selection
   (1) Tx UE operation
      1) The UE selects the resources to use randomly in on discovery period.
      2) The UE determines whether the type of the resource region including the resource it has selected is the Max. region or the Ctrl. region.
      3) The UE determines, when the selected resource region is the Ctrl. region, whether the network is congested in use of the resource. At this time, the Tx UE can determine whether the network is congested in various ways. For example, the Tx UE may measure the power on the resources during the discovery period in the reception mode to determine the congested state when the measurement result is equal to or greater than (or only when greater than) a predetermined threshold value. Also, the Tx UE may perform Cyclic Redundancy Check (CRC) on the resources during the discovery period to determine the congested state when the success rate of CRC result is equal to or less than (or only when less than) a predetermined threshold value. Also, the Tx UE may determine that the network is not in a congested state when the success rate of the CRC result is equal to or greater than (or only when greater than) a predetermined threshold value. The threshold value may be stored according to an instruction of the eNB or preconfigured at the UE manufacturing stage.
      4) If the selected resource region is the Ctrl. region and the network is currently in the congested state, the UE transmits the D2D information at a predetermined transmit power rather than the maximum transmit power. The predetermined transmit power may be stored according to an instruction of the eNB or preconfigured at the UE manufacturing stage. The predetermined transmit power may be mapped to the congestion degree (congestion level) of the network. In an embodiment, the network congestion may be divided into two levels to which predetermined transmit power values are mapped, and the transmit power may be set to one of a predetermined value and 0, i.e., transmission on/off, for each level. It is obvious that the transmit power can be set to 0 (off for indicating non-transmission of D2D information) in association with the high congestion level.
      5) In all other cases, the UE performs transmission at the maximum transmit power.
   (2) Rx UE operation
      1) The UE performs decoding on the whole resources during the discovery period with the exception of subframes including the resources for use in transmission.

2) After decoding, the UE calculates and stores the CRC success rate. This can be used for determining presence/absence of network congestion when it operates as a Tx UE.
3) The UE measures power on the whole resources during the discovery period with the exception of subframes including resources for use in transmission. The measurement result can be used for determining presence/absence of network congestion when it operates as a Tx UE.

2. Energy sensing-based resource selection
(1) Tx UE operation
   A. The UE performs energy scanning (sensing) on the Max. region during one discovery period for selecting resources. In this case, the energy scanning may be interpreted as measuring an energy level that can be calculated by averaging per-symbol Reference Signal Received Powers (RSRPs) over time.
   B. The UE selects resources based on the scanning result. For example, the UE selects the resource on which the sensed energy is equal to or less than a predetermined threshold energy level or one of the resources having the lowest z % energy level randomly after sorting the energy levels of all resources.
   C. The UE determines whether the type of the resource region including the selected resource is the Max. region or the Ctrl. region.
   D. If the selected resource region is the Ctrl. region, the UE determines whether the network is congested in use of the resource. At this time, the Tx UE can determine whether the network is congested in various ways. For example, the Tx UE may determine whether the network is congested based on the energy level on the resource during the discovery period predetermined in the energy sensing process. In this case, the Tx UE may determine that the network is in the congested state when the number of RBs having the energy equal to or greater than a predetermined threshold energy level (e.g., a dBm) is equal to or less than x % of the total number of RBs. The Tx UE may also determine that the network is not in a congested state when the number of RBs having the energy equal to or less than a predetermined threshold energy level (e.g., b dBm) is equal to or greater than y % of the total number of RBs. Also, the Tx UE may perform Cyclic Redundancy Check (CRC) on the resources during the discovery period to determine the congested state when the success rate of the CRC result is equal to or less than (or only when less than) a predetermined threshold value. Also, the Tx UE may determine that the network is not in a congested state when the success rate of the CRC result is equal to or greater than (or only when greater than) a predetermined threshold value. The threshold value may be stored according to an instruction of the eNB or preconfigured at the UE manufacturing stage.
   E. If the selected resource region is the Ctrl. region and if the network is currently in the congested state, the UE transmits the D2D information at a predetermined transmit power rather than the maximum transmit power. The predetermined transmit power may be stored according to an instruction of the eNB or preconfigured at the UE manufacturing stage. The predetermined transmit power may be mapped to the congestion degree (congestion level) of the network. In an embodiment, the network congestion may be divided into two levels to which predetermined transmit power values are mapped, and the transmit power may be set to one of a predetermined value and 0, i.e., transmission on/off, for each level. It is obvious that the transmit power can be set to 0 (off for indicating non-transmission of D2D information) in association with the high congestion level.
   F. In all other cases, the UE performs transmission at the maximum transmit power.
(2) Rx UE operation
   The UE performs decoding on the whole resources during the discovery period with the exception of subframes including the resources for use in transmission.

According to an embodiment of the present invention, the eNB may calculate the number of UEs utilizing D2D service within a cell statistically through D2D capability negotiation procedure for the initial attach of D2D UE. The eNB may determine the congestion occurring in resource access (or resource occupancy) of the D2D UE based on the calculation result to control the resource access of the D2D UE. For example, if the number of D2D UEs located within the cell is statically large, the eNB may increases the amount of the D2D resources for use by the D2D UEs. In contrast, if the number of D2D UEs located within the cell is statically small, the eNB may reduce the amount of the D2D resources for use by the D2D UEs. In this way, it may be possible to avoid resource collision occurring when D2D UEs perform random resource selection or energy level-based resource selection. The D2D resource information (e.g., frequency-time domain positions of D2D resources and period and interval of D2D resources) delivered to the D2D UEs through an SIB or RRC signaling within the cell may be changed at a predetermined time or according to a predetermined event. For example, it is predicted that the D2D service utilization increases from the business closing time to AM 1~2 in residential areas, and it may be preferred to increase resource amounts in business areas (company concentration areas) during the period from business open time to business closing time. Also, it is predicted that the D2D service utilization increases at a stadium such as a ball park or a soccer field on a game day, the eNB may increase the resource amount for use by the D2D UEs within the cell when such an event occurs. If the resource amount is not changed, the eNB may inform the UE whether there is any change in the resource information including resource amount and power control parameter. The UEs that have already attached may not receive the resource information and power control parameter being transmitted after recognizing no change in the resource information and power control parameter through such signaling.

According to an embodiment, the eNB may check the congestion degree without adjusting the resource amount to avoid resource collision occurring when the D2D UEs select resources. In detail, the eNB increases a D2D UE resource access control probability p for the case where the number of D2D UEs increases within a cell, and decreases the D2D UE resource access control probability p for the case where the number of D2D UEs decreases within the cell. The eNB transmits the D2D UE resource access control probability p to the D2D UE through an SIB or RRC signaling. For example, assuming p={0, 0.2, 0.4, 0.8, 1}, if the eNB sets p to 1, the UE may perform the random resource selection or energy level-based resource selection on one of the discovery resources during every discovery period when the total discovery period is set to L. In contrast, if the eNB sets p to one of the values with the exception of 1, the UE performs resource access at an interval of p*L (e.g., Assuming L=10 and p=0.5, p*L is 5; thus, the random resource selection or energy level-based resource selection is performed at every 5 discovery periods. If p*L is not an integer, truncation or rounding may be performed). For example, the UE resource access control probability may be applied during the discovery period. That is, the UE performs the random resource selection or energy level-based resource selection at the probability of p during one discovery period and performs resource access at the probability of p during every discovery period while the eNB does not change the probability p.

Figure 7:
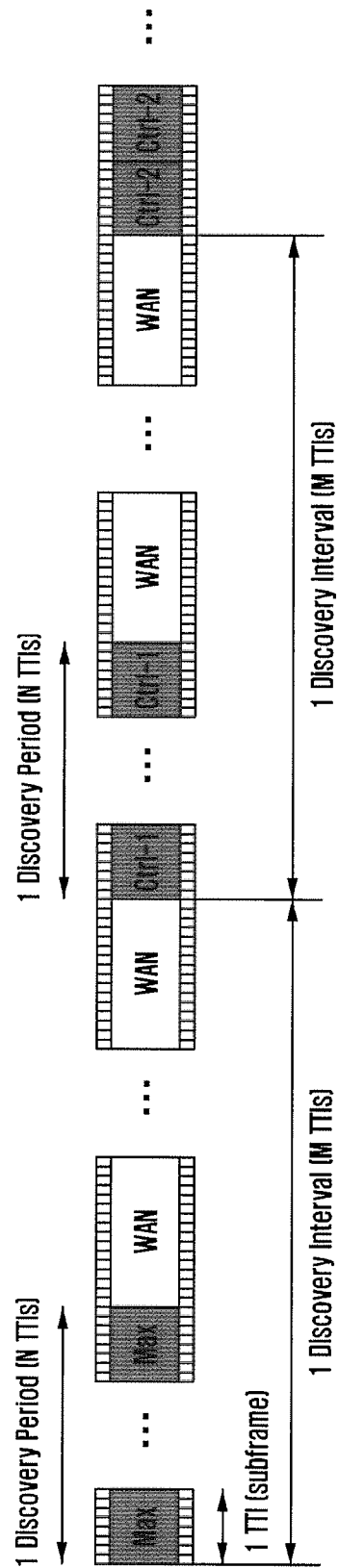
FIG. 7 is a diagram illustrating a D2D resource structure with a plurality of discovery resource pools according to another embodiment of the present invention.

For example, the resource access control may be performed based on the combination of aforementioned eNB-predicted congestion (acquired through D2D capability negotiation procedure) and the UE-predicted congestion through CRC test. In detail, assuming the UE's resource occupancy probability based on the eNB-predicted congestion is p1 and the UE's resource access probability based on the CRC test-based congestion determination is p2, the resource access probability of the UEs within the cell may be determined based on the various combinations of p1 and p2. For example, the weighted sum of p1 and p2 can be used. That is, the resource access probability of a UE may be determined by c*p1+(1−c)*p2. Here, c denotes a value which the eNB transmits to the UE through an SIB or RRC signaling and is set to a value between 0 and 1. The information on whether to use p1 and p2 for determining the congestion degree of the UE may be transmitted to the UE through the SIB or RRC signaling. For example, if p2 is set to off, only p1 is used to determine the congestion degree. FIG. 7 is a diagram illustrating a D2D resource structure according to another embodiment of the present invention. In the embodiment of FIG. 6, one discovery period corresponding to N TTIs (N subframes) is split into a maximum transmit power resource region (Max) and a controlled transmit power resource region (Ctrl). Unlike the embodiment of FIG. 6, FIG. 7 exemplifies use of equal transit power in one discovery period consisting of N TTIs. That is, it may be possible to use the maximum transmit power in one discovery period while the controlled transmit power is used in another discovery period. Also, it is exemplified that different transmit power levels may be applied per discovery period. Here, the transmit power for each discovery period may be determined by i) the eNB, ii) the UE with the assistance of the eNB, or iii) by the UE without assistance of the eNB.

i) Case of being determined by eNB: The eNB may transmit the transmit power value per discovery period along with the discovery resource information (on N TTIs constituting the discovery period and M TTIs constituting an interval) to the D2D eNBs through the SIB or RRC signaling within the cell. The eNB may inform to use the maximum transmit power during the discovery period K, transmit power P1 during the discovery period K+1, and transmit power P2 during the discovery period K+2. Such transmit power values may be mapped to the discovery periods implicitly (in this case, only the resource information, without the transmit power values, is transmitted to the UE through the SIB or RRC signaling) or transmitted explicitly (in this case, the transmit power values to be used for respective discovery periods are transmitted to the UE through the SIB or RRC signaling along with the resource information). The UE operates as described with reference to FIG. 6 when the eNB determines the transmit power values.

ii) Case of being determined by UE with assistance of eNB: The eNB transmits to the UE a transmit power parameter rather than the transmit power values allowed for the UEs. For example, in an LTE cellular system, $P_{0\_PUSCH}$ and $\alpha$ are used for transmit power control as shown in equation (1).

$$P_{PUSCH}(i) = \min\left\{ \begin{array}{l} P_{CMAX}(i), \\ 10\log_{10}(M_{PUSCH}(i)) + P_{0\_PUSCH}(j) + \alpha(j) \cdot PL + \Delta_{TF}(i) + f(i) \end{array} \right\} \quad (1)$$

$$[dBm]$$

In equation (1), $P_{0\_PUSCH}$ denotes the transmit power of Physical Uplink Shared Channel at the $i^{th}$ subframe of the UE.

The $P_{0\_PUSCH}$ parameter indicating $P_{0\_NOMINAL\_PUSCH} + P_{0\_UE\_PUSCH}$ and transmitted from the eNB to the UE through higher layer signaling. In particular, $P_{0\_NOMINAL\_PUSCH}$ is an 8-bit cell-specific value in the range of [−126, 24] dB. Meanwhile, $P_{0\_UE\_PUSCH}$ is a 4-bit UE-specific value in the range of [−8, 7] dB. The eNB broadcasts the cell-specific value through an SIB and transmits the UE-specific value to the UE through dedicated RRC signaling. Meanwhile, $\alpha$ denotes a cell-specific value for compensating for the path loss and is 3-bit information carrying one of {0, 0.4, 0.5, 0.6, 0.7, 0.8, 0.9, 1}.

If $P_{0\_PUSCH}$ and $\alpha$ are received from the eNB, the UE may calculate the transmit power based thereon. That is, $P_{0\_PUSCH}$ and $\alpha$ values for use during the discovery period K and the $P_{0\_PUSCH}$ and $\alpha$ values for use during the discovery period K+1 that are transmitted by the eNB through the SIB or RRC signaling may differ from each other. Upon receipt of these values, the UE may calculate its transmit power based on the parameter values corresponding to the selected resource region and the path loss measured between the eNB and the UE.

In order to apply the parameter values being used in the legacy LTE cellular system to the D2D system, it is necessary to modify the parameter values. For example, the UE-specific parameter $P_{0\_UE\_PUSCH}$ may not be necessary in the D2D discovery supporting transmission of RRC_Idle UEs. This is because the UEs in the RRC_Idle state cannot receive any dedicated RRC signal from the eNB.

Also, in order to support Public Service (public safety and disaster) recovery purpose, it is necessary to extend the range of the cell specific $P_{0\_NOMINAL\_PUSCH}$ from [−126, 24] dB to [−126, 31] dB. This is because the UE class for use in Public Service is higher than that of the normal UE and thus supports a maximum transmit power (31 dB) higher than that of the normal UE (23 dB). The D2D Tx UE and D2D Rx UE operate as follows in the case where the UE determines the transmit power with the assistance of the eNB.

1. Random resource selection
   (1) Tx UE operation
      A. The UE receives discovery resource pool information (purpose of resource pool, positions on time and frequency axes of resource pool, resource access probability, and transmit power control parameters per resource pool ($P_{0\_PUSCH}$ and $\alpha$)).
      B. The UE selects resources randomly during the discovery period in one or more resource pools that the eNB has allowed for use among a plurality resource pools.
      C. If the eNB commands a D2D Tx UE to use the maximum transmit power through dedicated RRC signaling or D2D DCI or commands all D2D UEs located within the cell to use the maximum transmit power in a specific resource pool through an SIB or RRC signaling, the UE ignores the transmit power control parameters received previously through the SIB or RRC signaling and uses the maximum transmit power according to the command from the eNB. If such a command is not received, the D2D Tx UE operates as follows.

D. The UE calculates the transmit power using the path loss value estimated based on the Reference Signal Received Power (RSRP) from the eNB and the transmit power control parameters (at this time, in order for the UE operating in a cellular DRX mode to measure RSRP for D2D transmission power control, the UE has to go out of the DRX mode and performs RSRP measurement using the Cell-specific Reference Signal (CRS) carried in downlink subframes. Before RSRP measurement, the D2D Tx UE may achieve downlink synchronization with the eNB using the downlink synchronization signals (Primary Synchronization Signal/Secondary Synchronization Signal (PSS/SSS)) of the eNB).

E. The UE determines whether to perform transmission on the resources selected in the discovery period based on parameters for use in determining whether congestion exists in use of the resource. At this time, the parameters for use in determining whether congestion exists may be received from the eNB or determined through CRC test performed when the D2D Tx UE operates in the reception mode. These two methods may be used in a combined manner.

F. The UE transmits the discovery signal at a given resource access probability using the transmit power value calculated for the selected resource.

(2) Rx UE operation

A. The UE receives resource pool information for receiving D2D data (e.g., resource pool information, resource configuration information on time and frequency axes of resource pool).

B. The UE performs decoding on the whole resources during the discovery period with the exception of the subframes including the resources for use in transmission in one or more resource pools designated by the eNB for reception.

C. The UE determines whether the eNB controls the resource access probability p2 according to the presence/absence of the congestion degree measured by the D2D UE, resource access probability p1 according to the congestion degree predicted by the eNB through a D2D capability negotiation procedure, or resource access at a probability of a combination of p1 and p2 (the UE receives p1=on/off or p2=on/off through an SIB or RRC signaling. If p1=on and p2=on, the UE also receives a c value determining c*p1+(1−c)*p2 through the SIB or RRC signaling).

D. If p1=off and p2=on or p1=on and p2=on, the UE performs decoding and calculates and stores the CRC success rate. The CRC success rate may be used to determine presence/absence of congestion in use of the resources when the UE operates in the transmission mode. Otherwise if p1=off and p2=off or if p1=on and p2=off, the UE performs decoding only and does not calculate the CRC success rate.

2. Energy sensing-based resource selection (1) Tx UE operation

A. The UE receives the discovery resource pool information, resource access probability, and transmit power control parameters per resource pool in a way similar to the process A of the random resource selection.

B. The UE performs scanning on the resources during the discovery period in one or more resource pools that the eNB allowed for use among a plurality of resource pools in a way similar to the process B of the random resource selection.

C. The UE selects resources based on the scanning result. For example, the UE may select the resource on which the sensed energy is equal to or less than a predetermined threshold energy level or one of the resources having the lowest z % energy level randomly after sorting the energy levels of all resources.

D. Identical with process C of the random resource selection

E. Identical with process D of the random resource selection

F. The UE may determine whether to perform transmission on the resource selected during the discovery period based on the parameters for use in determining presence/absence of congestion in use of resource. At this time, the parameter for use in determining presence/absence of congestion may be received from the eNB or determined through energy sensing when the D2D UE is operating in the reception mode. These two methods may be used in a combined manner. Particularly in the case of determining the congestion degree in use of the resource through energy sensing, the Tx UE may determine that the network is in the congested state when the number of RBs having the energy equal to or greater than a predetermined threshold energy level (e.g., a dBm) is equal to or less than x % of the total number of RBs. The Tx UE may also determine that the network is not in a congested state when the number of RBs having the energy equal to or less than a predetermined threshold energy level (e.g., b dBm) is equal to or greater than y % of the total number of RBs.

G. If the selected resource region is the Ctrl. region, the UE determines that the network is in the congested state in use of the resource. The Tx UE may determine whether the network is in the congested state in various ways. For example, the Tx UE may determine whether the network is in the congested state based on the energy value on the resource in the discovery period that is predetermined in the energy sensing process. In this case, the Tx UE may determine that the network is in the congested state when the number of RBs having the energy equal to or greater than a predetermined threshold energy level (e.g., a dBm) is equal to or less than x % of the total number of RBs. The Tx UE may also determine that the network is not in a congested state when the number of RBs having the energy equal to or less than a predetermined threshold energy level (e.g., b dBm) is equal to or greater than y % of the total number of RBs.

H. The UE transmits the discovery signal at a given resource access probability using the transmit power value calculated on the selected resource.

(2) Rx UE operation

A. The UE receives resource pool information for receiving D2D data (e.g., resource pool information, resource configuration information on time and frequency axes of resource pool).

B. The UE performs decoding on the whole resources during the discovery period with the exception of the subframes including the resources for use in transmission in one or more resource pools designated by the eNB for reception.

C. The UE determines whether the eNB controls the resource access probability p2 according to the presence/absence of the congestion degree measured by the D2D UE, resource access probability p1 according to the congestion degree predicted by the eNB through a D2D capability negotiation procedure, or resource access at a probability of a combination of p1 and p2 (the UE receives p1=on/off or p2=on/off through an SIB or RRC signaling. If p1=on and p2=on, the UE also receives a c value determining c*p1+(1−c)*p2 through the SIB or RRC signaling).

D. If p1=off and p2=on or p1=on and p2=on, the UE performs decoding and calculates and stores the CRC success rate. The CRC success rate may be used to determine presence/absence of congestion in use of the resources when the UE operates in the transmission mode. Otherwise if p1=off and p2=off or if p1=on and p2=off, the UE performs only decoding and does not store the power value measured on the resource.

iii) Case of being determined by UE without assistance of eNB: In a disaster situation such as a fire and earthquake, an emergency situation such as a terror incident or a building collapse, or a public safety situation, it is difficult to guarantee communication between an eNB and a UE because of a breakdown of the eNB. In such a situation, the UE may perform transmit power control based on the previously stored transmit power parameters and resource information. That is, the UE may use the transmit power P1 in the resource region K and the transmit power P2 in the resource region K+1. At this time, P1 and P2 may be the maximum transmit powers.

Figure 8:
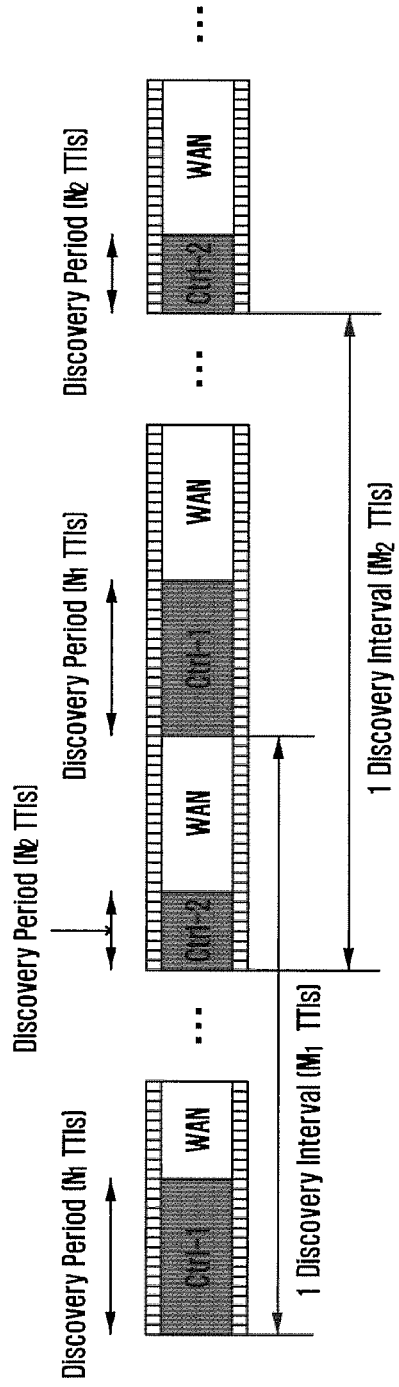
FIG. 8 is a diagram illustrating a D2D resource structure with a plurality of discovery pools having different discovery periods and discovery intervals according to another embodiment of the present invention.

FIG. 8 is a diagram illustrating a D2D resource structure according to another embodiment of the present invention. Unlike FIGS. 6 and 7, FIG. 8 exemplifies a case of multiple discovery resources. In FIGS. 6 and 7, the discovery resource is configured such that a discovery period consisting of N TTIs appears repeatedly at an interval equivalent to M TTIs; however, in FIG. 8 a discovery period consisting of N1 TTIs appears repeatedly at an interval of M1 TTIs and another discovery period consisting of N2 TTIs appears repeatedly at an interval of M2 TTIs. The D2D resource structure may be configured such that one discovery period consisting of N1 or N2 TTIs includes resource regions with different transmit powers as shown in FIG. 6 or that each of the discovery periods includes the resource regions with the same transmit power as shown in FIG. 7 but the resource regions of the different discovery periods have different transmit powers. In order to accomplish this, the eNB transmits to the UE the information on the purpose of each discovery resource pool (e.g., commercial/Public Safety purpose, Type 1 discovery/Type 2B discovery, and short/medium/long range classes), time axis resource information of the discovery resource pool (e.g., discovery period and discovery interval), frequency axis resource information of the discovery pool (e.g., start and end points of the discovery resource pool on the frequency axis), and transmit power control parameters for each resource pool through an SIB or RRC signaling. At this time, as described with reference to FIG. 7, the transmit power may be determined by the eNB according to the type of the transmit power control parameters or by the UE autonomously with or without assistance of the eNB.

Figure 9:
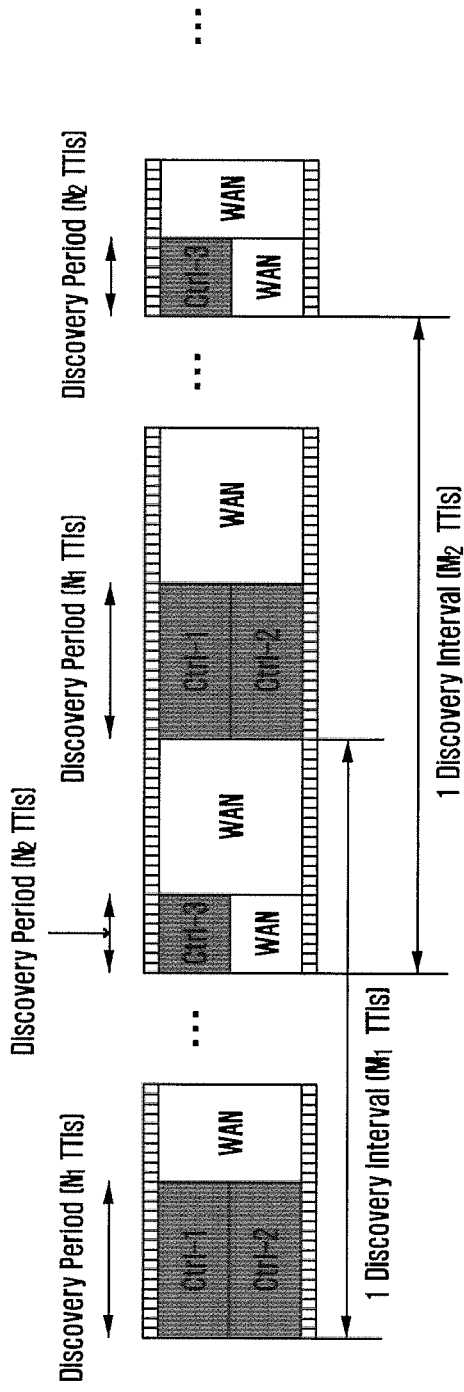
FIG. 9 is a diagram illustrating a D2D resource structure in which a plurality of discovery resource pools is Time Division Multiplexed (TDMed) and Frequency Division Multiplexed (FDMed), according to another embodiment of the present invention.

FIG. 9 is a diagram illustrating a D2D resource structure according to another embodiment. The embodiment of FIG. 9 differs from the embodiment of FIG. 8 in that a plurality of discovery resource pools can exist on the frequency axis. In detail, a discovery resource pool consisting of N1 TTIs and having a discovery interval of M1 TTIs may include two or more different resource pools with different transmit power control parameters. Also, there may be another discovery resource pool consisting of N2 TTIs and having a discovery interval of M2 TTIs. As described with reference to FIG. 8, the eNB transmits the time and frequency resource information of the discovery resource pool and the transmit power control parameters for the respective resource pools to the UE through the SIB or RRC signaling. Although not shown in FIG. 9, two or more different resource pools may be frequency-division-multiplexed (FDMed) into a Physical Uplink Shared Channel (PUSCH) for cellular (Wide Area network (WAN)) uplink transmission during one discovery period.

Figure 10:
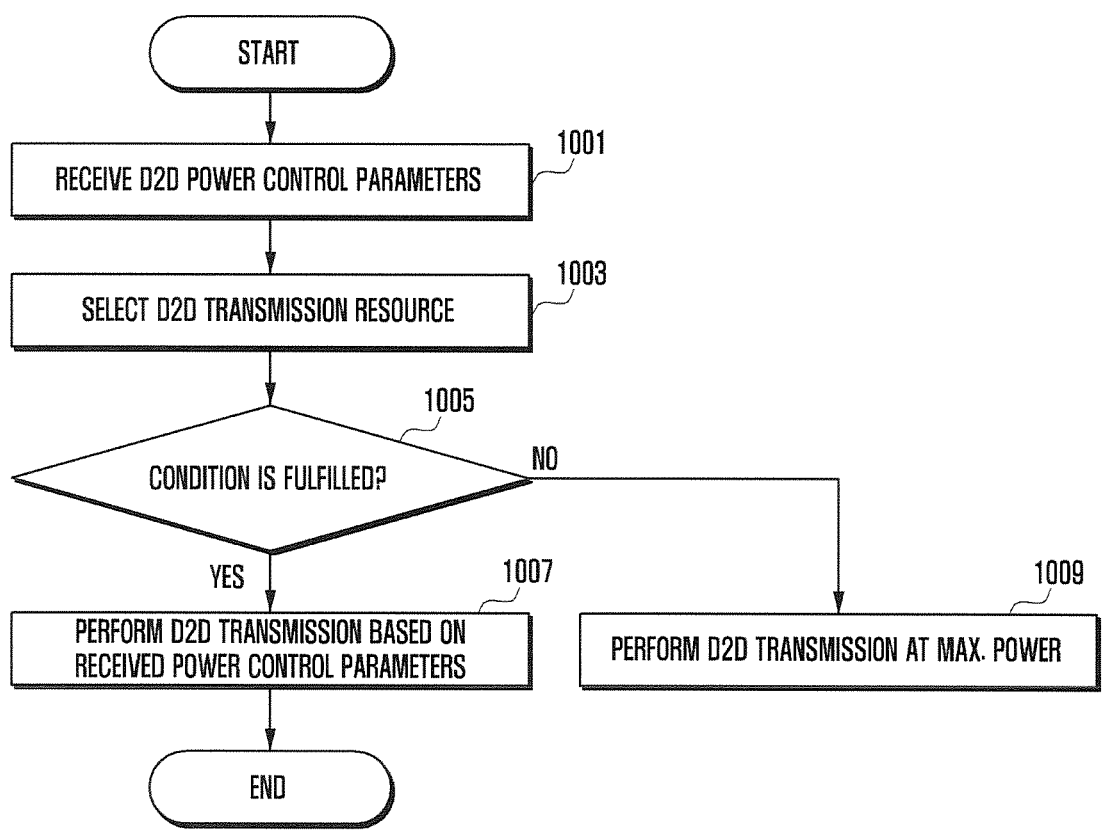
FIG. 10 is a flowchart illustrating a power control method of a D2D Tx UE according to an embodiment of the present invention.

FIG. 10 is a flowchart illustrating a power control method of a D2D Tx UE according to an embodiment of the present invention.

In reference to FIG. 10, the Tx UE receives a D2D power control parameter at step 1001. The Tx UE receives the D2D power control information from the eNB through an SIB. The D2D power control information may include D2D discovery information and D2D resource selection information. For example, the D2D power control information may include the D2D resource region information, discovery period information, D2D resource pool type information, and preconfigured transmit power information. The D2D power control parameter may be transmitted through, but not limited to, the SIB.

The Tx UE may select D2D resource at step 1003 using the above described random resource selection method or energy sensing-based resource selection method.

The Tx UE determines whether the selected D2D resource fulfils a predetermined condition, i.e., transmit power control condition, at step 1005. That is, the Tx UE may determine whether the selected D2D resource belongs to a Ctrl. region and whether the condition that the network is currently congested is fulfilled.

In detail, the Tx UE determines the type of the resource region including the selected D2D resource and whether the network is congested. The Tx UE may determine whether the selected D2D resource belongs to a Max. region or a Ctrl. region. The Tx UE may also determine whether the network is congested based on one of the power or energy level measured on the selected D2D resource and CRC test result on the selected D2D resource.

If the selected D2D resource fulfils the transmit power control condition, the Tx UE controls transmit power based on the D2D power control parameter to transmit a D2D discovery signal or D2D communication data at step 1007.

Otherwise if the selected D2D resource does not fulfil the transmit power control condition, the Tx UE transmits the D2D discovery signal or D2D communication data at the maximum transmit power at step 1009.

Figure 11:
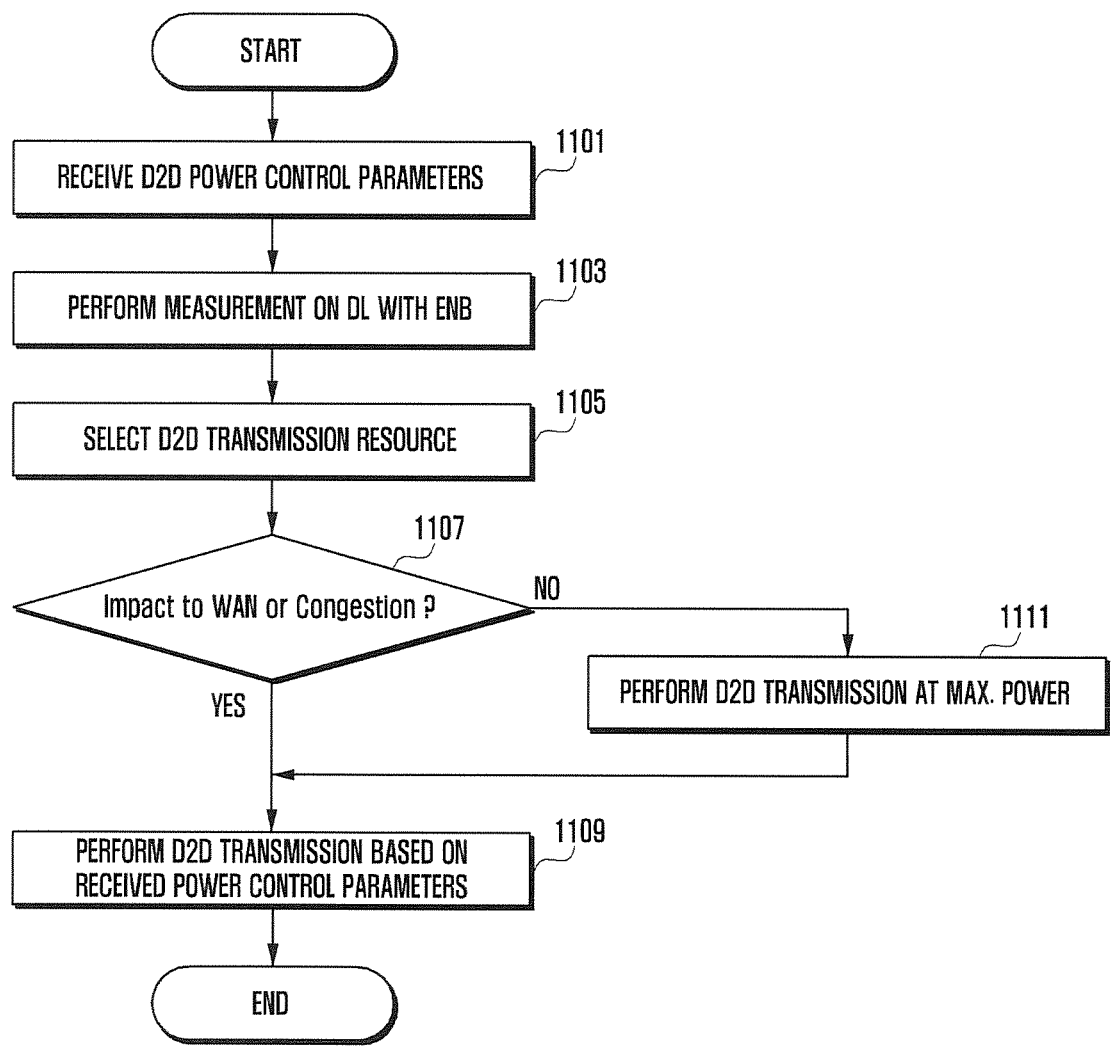
FIG. 11 is a flowchart illustrating a power control method of a D2D Tx UE according to another embodiment of the present invention.

FIG. 11 is a flowchart illustrating a power control method of a D2D Tx UE according to another embodiment of the present invention.

Unlike the embodiment of FIG. 10, which is directed to the power control in consideration of solving the in-band emission problem between D2D UEs, the embodiment of FIG. 11 is directed to the power control in consideration of solving the in-band emission problem being incurred also to the eNB.

The power control for solving the in-band emission problem between D2D UEs is performed in consideration of the D2D receiver, but the power control for solving an in-band emission problem being incurred to the eNB is performed in consideration of the eNB receiver. Accordingly, it is necessary for two different power control schemes operating under different conditions to interwork, and the power control method designed in consideration of such interworking is proposed in the embodiment of FIG. 8

In order to solve the in-band emission problem being incurred to the eNB, the D2D Tx UE located close to the eNB has to perform power control to avoid in-band emission on the PUCCH transmitted to the eNB. In a situation where the D2D Tx UE located close to the eNB causes in-band emission to a D2D Rx UE, the D2D Tx UE has to perform power control to cancel the in-band emission interference to the D2D Rx UE.

In reference to FIG. 11, the D2D Tx UE receives power control parameters from the eNB through an SIB at step 1101. The power control parameters may include a transmit power value $P_{eNB}$ for solving the in-band emission occurring at the eNB and another transmit power value $P_{D2D}$ for solving the in-band emission occurring at the D2D receiver. Although one transmit power value per each of two transmit power control schemes is provided in an embodiment of the present invention, the eNB may transmit the transmit power values to the UE in the form of a table including a plurality of levels through an SIB. The transmit power values are formatted in a table shown in FIG. 12 according to whether the Tx UE causes interference to the PUCCH at the eNB and whether the network is congested, and then the table is transmitted to the UE.

Upon receipt of the power control parameters, the D2D Tx UE measures downlink quality on the link established with the eNB for estimating a distance from the eNB at step 1103. The downlink quality may be measured based on various types of reference signals transmitted from the eNB to the UE such as Cell-specific Reference Signal (CRS) and Demodulation Reference Signal (DMRS). The downlink quality measurement may be performed before or after transmission resource selection.

Next, the Tx UE selects D2D resource using the above-described random resource selection method or energy sensing-based resource selection method at step 1105.

In the case of transmitting signals at the maximum transmit power on the selected D2D resource, the Tx UE determines at step 1107 whether the transmission affects PUCCH reception at the eNB and whether the network is currently congested.

The Tx UE may determine whether the transmission affects PUCCH reception at the eNB according to the result of a comparison between the measured downlink quality and $P_{eNB}$ value received through the SIB. This can be determined based on whether the Tx UE is located close to the eNB and whether the PUCCH is mapped to the frequency adjacent to the resource selected by the Tx UE.

The Tx UE may also determine whether the network is congested based on at least one of the power or energy level measured on the selected D2D resource and the result of CRC test performed on the selected D2D resource.

If it is determined that the transmission affects the PUCCH reception at the eNB or the network is congested, the Tx UE controls the transmit power based on the received D2D power control parameters to transmit the D2D discovery signal or the D2D communication data at step 1109. For example, if it is determined that the transmission affects PUCCH reception at the eNB, the Tx UE transmits the D2D information at the transmit power $P_{eNB}$; if it is determined that the network is congested, the Tx UE transmits the D2D information at the transmit power $P_{D2D}$.

Otherwise, if it is determined that neither the transmission affects PUCCH reception at the eNB nor the network is congested, the Tx UE transmits the D2D discovery signal or the D2D communication data at the maximum transmit power at step 1111.

In the case of both the event triggering transmission at the transmit power $P_{D2D}$ and the event triggering transmission at the transmit power $P_{eNB}$ on the selected D2D resource, i.e., if the transmission affects PUCCH reception at the eNB and the network is congested, the Tx UE may adjust the transmit power to the smallest one of the two values (i.e., $\min\{P_{eNB}, P_{D2D}\}$). If one of the two events occurs, the Tx UE performs D2D transmission at the transmit power matching the corresponding event as described above. If none of the events occurs, the Tx UE transmits the D2D discovery signal or data at the maximum transmit power as described above.

Figure 13:
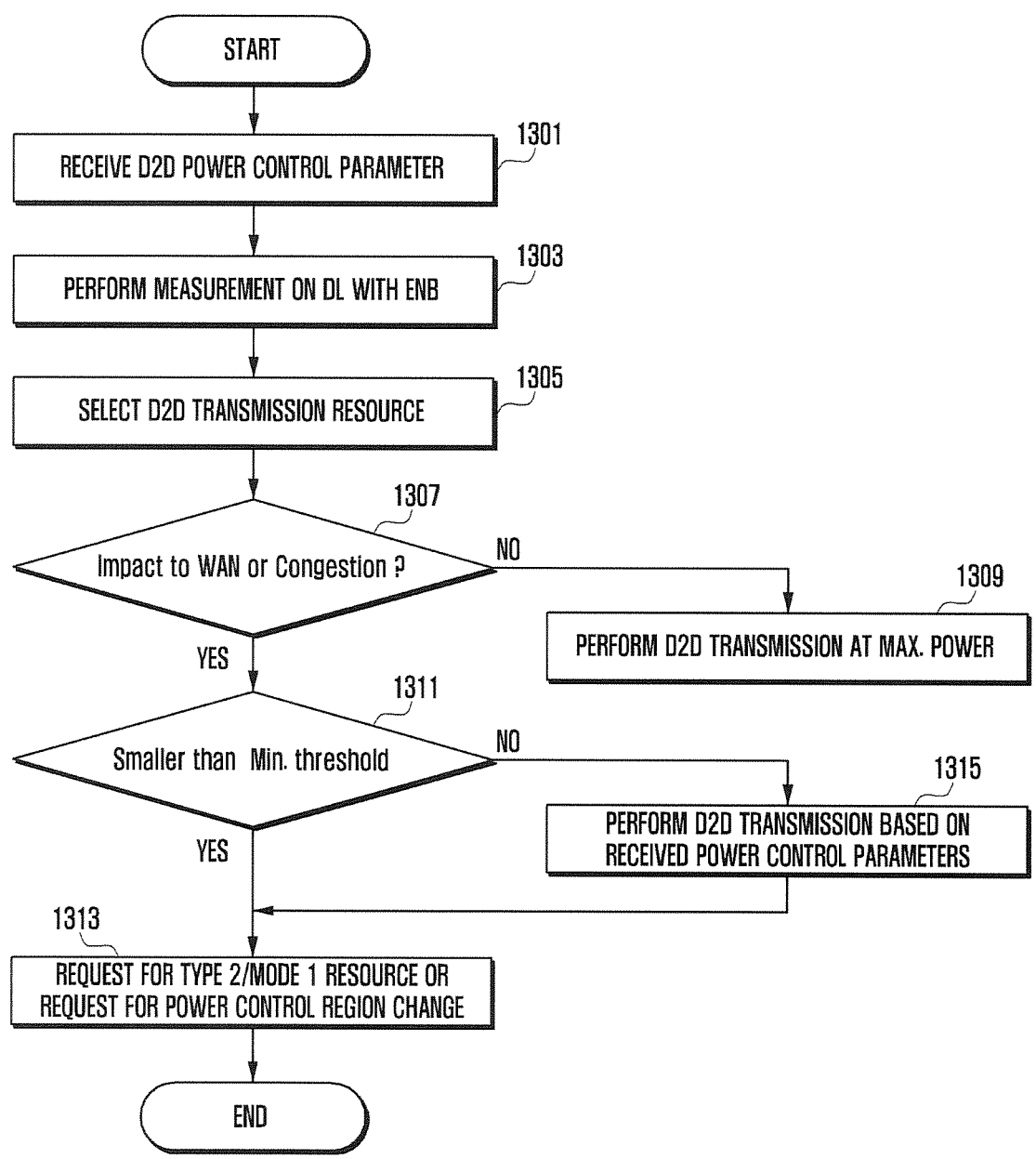
FIG. 13 is a flowchart illustrating a power control method of a D2D Tx UE according to still another embodiment of the present invention.

FIG. 13 is a flowchart illustrating a power control method of a D2D Tx UE according to still another embodiment of the present invention.

Unlike the embodiment of FIG. 11, the embodiment of FIG. 12 is directed to the case of using a minimum D2D transmit power $P_{TH}$ to guarantee D2D performance; thus, the D2D Tx UE requests to the eNB for resource changed when the $\min\{P_{eNB}, P_{D2D}\}$ becomes less than $P_{TH}$.

Steps 1301 to 1309 are equivalent to the corresponding steps of FIG. 11.

In reference to FIG. 13, the Tx UE determines at step 1311 whether the transmit power determined according to the determination result at step 1307 is less than the minimum threshold value.

If the transmit power is not less than the minimum threshold value, the Tx UE transmits the D2D information at the transmit power determined finally, as in the embodiment of FIG. 11, at step 1315.

If the transmit power is less than the minimum threshold value, the Tx UE request to the eNB for resource change at step 1313.

In the case of D2D discovery, if the transmit power of the UE operating in Type 1 is less than $P_{TH}$, the Tx UE requests to the eNB for switching the discovery method to Type 2. In the case of D2D communication, if the transmit power of the UE operating in Mode 2 is less than $P_{TH}$, the Tx UE requests to the eNB for switching the communication method to Mode 1.

In the case that the UE to be switched to Type 2/Mode 1 is in the RRC_Idle state, the Tx UE performs random access to be allocated resources for transmitting a resource request. In the case that the UE to be switched to Type 2/Mode 1 is in the RRC_Connected state, the Tx UE performs random access even when there is no resource for transmitting the resource request. In the case of being allocated resources for transmitting the resource request in the RRC_Connected state, the Tx UE transmits the resource request on the corresponding resources (i.e., If the resource for cellular PUSCH transmission is allocated, the resource request is piggybacked on the cellular data). If the resource request is received from the D2D Tx UE, the eNB may accept the resource request and transmit to the UE the information on the changed time/frequency resource through Physical Downlink Control Channel (PDCCH).

Meanwhile, the UEs that have performed D2D transmit power control may report the transmit power control results to the eNB. If the reports are received, the eNB performs monitoring during a predetermined time and then determines whether to increase or decrease the ratio of the Ctrl. regions. If the ratio of the Ctrl. regions is changed, the eNB broadcasts the change through an SIB in order for receipt by all D2D UEs within the cell.

Figure 14:
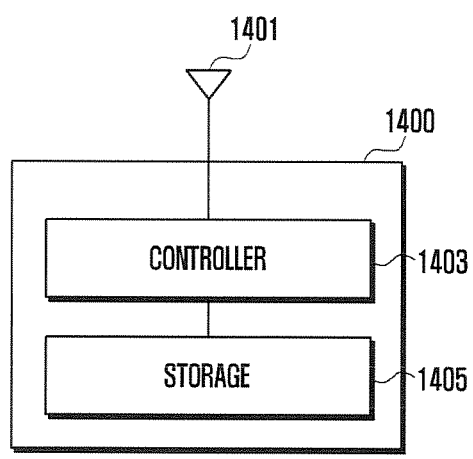
FIG. 14 is a block diagram illustrating a configuration of a D2D UE according to the present invention.

FIG. 14 is a block diagram illustrating a configuration of a D2D UE according to the present invention.

In reference to FIG. 14, the D2D UE 1400 according to the present invention includes a communication unit 1401, a controller 1403, and storage 1405. The D2D UE 1400 may operate as a Tx UE or an Rx UE according to an embodiment of the present invention.

The communication unit 1401 may transmit or receive data to or from another UE. For this purpose, the communication unit 1401 may include at least one communication module and at least one antenna.

The controller 1403 may control the components of the UE 1400 for the power control according to the present invention.

The storage 1405 may store various parameters for use in the operations according to the present invention.

It is to be appreciated that those skilled in the art can change or modify the embodiments without departing the technical concept of this invention. Accordingly, it should be understood that the above-described embodiments are essentially for illustrative purpose only and not in any way for restriction thereto. Thus the scope of the invention should be determined by the appended claims and their legal equivalents rather than the specification, and various alterations and modifications within the definition and scope of the claims are included in the claims.

The invention claimed is:

1. A method of a terminal performing Device-to-Device (D2D) communication, the method comprising:
   determining a received energy of each of a plurality of resources in a discovery period including a first resource area allocated for maximum transmission power and a second resource area allocated for controlled transmission power;
   selecting a resource for a D2D communication signal in the discovery period based on the received energy of at least one of the plurality of resources being lower than a threshold;
   determining whether the selected resource is included in the first resource area or the second resource area;
   determining whether a network is in a congested state based on the selected resource being included in the second resource area;
   determining a transmission power based on whether the network is determined in the congested state or not; and
   transmitting the D2D communication signal in the selected resource with the determined transmission power,
   wherein the transmission power is determined as a maximum transmission power based on the network not being in the congested state, and
   wherein the transmission power is determined based on a congestion level of the congested state based on the network being in the congested state, the congestion level including at least two levels corresponding to different power values.

2. The method of claim 1, wherein the first resource area includes resources for transmitting the D2D communication signal with the maximum transmission power and the second resource area includes resources for transmitting the D2D communication signal with a transmission power less than the maximum transmission power.

3. The method of claim 1, wherein determining whether the network is in the congested state comprises:
   measuring a power on the selected resource in the discovery period; and
   determining whether the network is in the congested state based on a power measurement result.

4. The method of claim 1, wherein determining whether the network is in the congested state comprises:
   performing a Cyclic Redundancy Check (CRC) test on the resource in the discovery period; and
   determining whether the network is in the congested state based on a CRC success rate.

5. The method of claim 1, further comprising transmitting the D2D communication signal in the selected resource with the maximum transmission power based on the selected resource being included in the first resource area.

6. The method of claim 1, further comprising determining whether interference occurs between the selected resource and a cellular terminal uplink resource adjacent to the selected resource,
   wherein a transmission power of the D2D communication signal is determined based on the determination result on whether the selected resource is included in the first resource area or the second resource area and whether interference occurs between the selected resource and the cellular terminal uplink resource.

7. The method of claim 1, further comprising requesting, if a transmission power of the D2D communication signal is less than a predetermined threshold value, to a base station for changing a D2D communication resource allocation mode.

8. A terminal performing Device-to-Device (D2D) communication, the terminal comprising:
   a transceiver; and
   a controller coupled with the transceiver and configured to:
      determine a received energy of each of a plurality of resources in a discovery period including a first resource area allocated for maximum power transmission and a second resource area allocated for controlled power transmission,
      select a resource for a D2D communication signal in the discovery period based on the received energy of at least one of the plurality of resources being lower than a threshold,
      determine whether the selected resource is included in the first resource area or the second resource area,
      determine whether a network is in a congested state based on the selected resource being included in the second resource area,
      determine a transmission power based on whether the network is determined to be in the congested state or not, and
      control the transceiver to transmit the D2D communication signal in the selected resource with the determined transmission power,
   wherein the transmission power is determined as a maximum transmission power in a case in which the network is not the congested state, and
   wherein the transmission power is determined based on a congestion level of the congested state in a case in which the network is in the congested state, the congestion level including at least two levels corresponding to different power values.

9. The terminal of claim 8, wherein the first resource area includes resources for transmitting the D2D communication signal with the maximum transmission power and the second resource area includes resources for transmitting the D2D communication signal with a transmission power less than the maximum transmission power.

10. The terminal of claim 8, wherein the controller is further configured to measure a power on the selected resource in the discovery period and determine whether the network is in the congested state based on a power measurement result.

11. The terminal of claim 8, wherein the controller is further configured to perform a Cyclic Redundancy Check (CRC) test on the resource in the discovery period and determine whether the network is in the congested state based on a CRC success rate.

12. The terminal of claim 8, wherein the controller is further configured to control the transceiver to transmit the D2D communication signal in the selected resource with the maximum transmission power based on the selected resource being included in the first resource area.

13. The terminal of claim 8, wherein the controller is further configured to determine whether interference occurs between the selected resource and a cellular terminal uplink resource adjacent to the selected resource, and wherein a transmission power of the D2D communication signal is determined based on the determination result on whether the selected resource is included in the first resource area or the second resource area and whether interference occurs between the selected resource and the cellular terminal uplink resource.

14. The method of claim 1, wherein the determining of the received energy comprises:
   identifying a reference signal received power (RSRP) in the discovery period; and
   determining the received energy in the discovery period by averaging the RSRP.

15. The method of claim 1, wherein the determining whether the network is in the congested state comprises:
   determining a number of resource blocks which have a greater energy level than a first threshold value determined based on the received energy of each resource in the discovery period; and
   determining that the network is in the congested state, if the number of the resource blocks which have the greater energy level than the first threshold value is equal to or less than a second threshold value.

16. The method of claim 1, wherein the determining whether the network is in the congested state comprises:
   determining a number of resource blocks which have a lower energy level than a first threshold value determined based on the received energy of each resource in the discovery period;
   determining that the network is in the congested state, if the number of the resource blocks which have the lower energy level than the first threshold value is greater than a second threshold value; and
   transmitting the D2D communication signal in the selected resource based on the maximum transmission power, if the network is not in the congested state.

17. The terminal of claim 8, wherein the controller is further configured to:
   identify a reference signal received power (RSRP) in the discovery period, and
   determine an energy level in the discovery period by averaging the RSRP.

18. The terminal of claim 8, wherein the controller is further configured to:
   determine a number of resource blocks which have a greater energy level than a first threshold value determined based on the received energy of each resource in the discovery period, and
   determine that the network is in the congested state, if the number of the resource blocks which have a greater energy level than the first threshold value is equal to or less than a second threshold value.

* * * * *